(12) United States Patent
Lee et al.

(10) Patent No.: US 11,488,412 B2
(45) Date of Patent: *Nov. 1, 2022

(54) FINGERPRINT SENSING METHOD, FINGERPRINT SENSOR, AND DISPLAY DEVICE INCLUDING THE SAME

(71) Applicant: SAMSUNG DISPLAY CO., LTD., Yongin-si (KR)

(72) Inventors: Hyun Dae Lee, Yongin-si (KR); Seung Hyun Moon, Yongin-si (KR); Dong Wook Yang, Yongin-si (KR); Hee Chul Hwang, Yongin-si (KR); Deok Hwa Woo, Yongin-si (KR); Young Eun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,179

(22) Filed: Aug. 2, 2021

(65) Prior Publication Data

US 2021/0365661 A1 Nov. 25, 2021

Related U.S. Application Data

(63) Continuation of application No. 16/943,534, filed on Jul. 30, 2020, now Pat. No. 11,080,507.

(30) Foreign Application Priority Data

Aug. 27, 2019 (KR) .................. 10-2019-0105124

(51) Int. Cl.
*G06V 40/13* (2022.01)
*G06T 3/40* (2006.01)
*G06V 40/12* (2022.01)

(52) U.S. Cl.
CPC ........ *G06V 40/1318* (2022.01); *G06T 3/4038* (2013.01); *G06V 40/1335* (2022.01); *G06V 40/1341* (2022.01)

(58) Field of Classification Search
CPC ........... G06V 40/1318; G06V 40/1335; G06V 40/1341; G06V 40/1324; G06V 40/1347; G06T 3/4038; G06T 5/001; G06T 5/30
See application file for complete search history.

(56) References Cited

U.S. PATENT DOCUMENTS 8,917,387 B1 12/2014 Lee et al.
9,996,198 B2 6/2018 Zhang
(Continued)

FOREIGN PATENT DOCUMENTS

KR 10-1900173 B1 9/2018
KR 10-1909617 B1 10/2018
KR 10-1923320 B1 11/2018

*Primary Examiner* — Abhishek Sarma
(74) *Attorney, Agent, or Firm* — Lewis Roca Rothgerber Christie LLP

(57) ABSTRACT

A fingerprint sensor includes a substrate, a light blocking layer that is on a first surface of the substrate and includes openings in a light blocking mask, and a sensor layer that is on a second surface of the substrate and includes photo sensors. A fingerprint sensing method of the fingerprint sensor includes: storing a calibration image; generating an original image, based on sensing signals from the photo sensors; performing calibration on the original image by utilizing the calibration image; and detecting a fingerprint, based on the calibrated image. The calibration image is generated by synthetizing valid regions extracted from an original calibration image corresponding to the original image.

20 Claims, 20 Drawing Sheets

(56) References Cited

U.S. PATENT DOCUMENTS

| | | |
|---|---|---|
| 10,083,335 B2 | 9/2018 | Zhang |
| 10,360,430 B2 | 7/2019 | Zhang et al. |
| 2014/0355846 A1 | 12/2014 | Lee et al. |
| 2017/0351898 A1 | 12/2017 | Zhang |
| 2018/0075278 A1 | 3/2018 | Zhang |
| 2018/0357460 A1 | 12/2018 | Smith et al. |
| 2019/0065808 A1 | 2/2019 | Zhang et al. |

FIG. 11
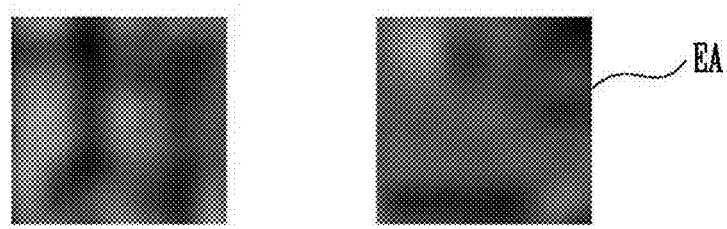
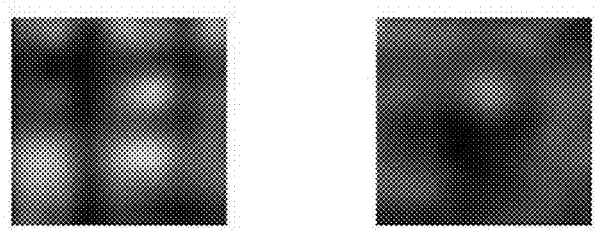
FIG. 12
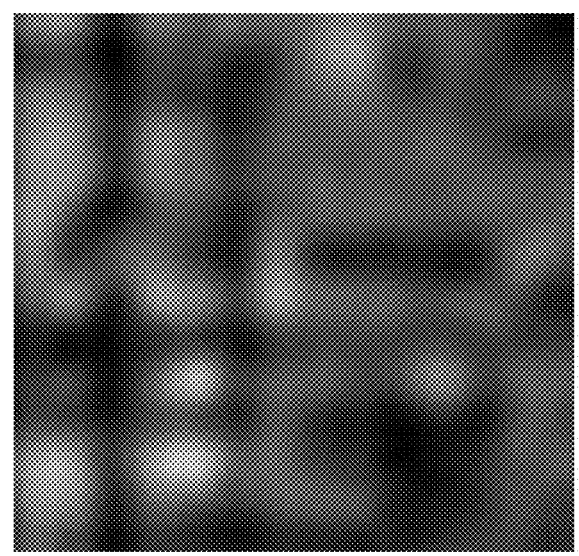

FINGERPRINT SENSING METHOD, FINGERPRINT SENSOR, AND DISPLAY DEVICE INCLUDING THE SAME

CROSS-REFERENCE TO RELATED APPLICATIONS

This application is a continuation of U.S. patent application Ser. No. 16/943,534, filed Jul. 30, 2020, which claims priority to and the benefit of Korean Patent Application No. 10-2019-0105124, filed Aug. 27, 2019, the entire content of both of which is incorporated herein by reference.

BACKGROUND

1. Field

One or more aspects of embodiments of the present disclosure generally relate to a fingerprint sensing method, a fingerprint sensor, and a display device including the same.

2. Related Art

A photosensitive type fingerprint sensor may include a light source and photo sensors. Each photo sensor may receive reflected light generated by a fingerprint of a user, and a fingerprint detector may detect the fingerprint by generating and processing an original image, based on the reflected lights.

The reflected light received by the photo sensor may include noise, or the original image may include noise (or error) due to a deviation of the photo sensor (and a light path). In order to remove the noise from the original image, the fingerprint detector may perform white calibration (or calibration) on the original image. For example, the fingerprint detector may calibrate the original image by using a white calibration image (or calibration data) that is pre-generated/pre-stored based on ambient light received by the photo sensor.

An optical structure may be disposed on an optical path between the fingerprint of the user and the photo sensor, and reflected light generated by the fingerprint may be provided to only some of photo sensors in a sensing region according to a disposition position of the optical structure (e.g., a distance from the optical structure to the fingerprint and a distance from the optical structure to the photo sensor). That is, a substantially valid region (i.e., a valid region) for fingerprint detection may be limited to only a portion in the original image. Nevertheless, the white calibration image may be stored with respect to the whole of the sensing region which may increase storage space and loading time of the white calibration data.

SUMMARY

Aspects of some example embodiments are directed to a fingerprint sensing method, a fingerprint sensor, and a display device including the same, which can minimize or reduce a storage space of a white calibration image and decrease a loading time of the white calibration image.

Aspects of some example embodiments are directed to a fingerprint sensing method, a fingerprint sensor, and a display device including the same, which can decrease a time for which white calibration is performed on an original image acquired through photo sensors (i.e., a time required to perform the white calibration).

One or more example embodiments of the present disclosure provide a fingerprint sensor including: a substrate; a light blocking layer on a first surface of the substrate, the light blocking layer including openings in a light blocking mask; a sensor layer on a second surface of the substrate, the sensor layer including photo sensors; and a fingerprint detector configured to generate an original image, based on sensing signals from the photo sensors, to perform calibration on the original image by using a calibration image, and to detect a fingerprint, based on the calibrated image, wherein the calibration image is generated by synthesizing valid regions extracted from an original calibration image corresponding to the original image.

The light blocking layer may transfer some a first light incident into the light blocking layer to the sensor layer through the openings, and block a second light.

A first one of the photo sensors may be to receive light through one opening, and a second one of the photo sensors may be to receive no light or to receive lights through two or more openings.

The valid regions may be generated based on sensing signals from first photo sensors from among the photo sensors configured to receive light through one opening.

The original calibration image may be generated based on sensing signals output from the photo sensors in response to light of a skin color.

The calibration image may be generated by extracting the valid regions in the original calibration image and putting together the valid regions.

The calibration image may have a capacity smaller than that of the original calibration image.

The fingerprint detector may extract the valid regions in the original image, generate a synthetic image by putting together the extracted valid regions, and perform calibration on the synthetic image by using the calibration image.

The fingerprint detector may perform the calibration by loading the calibration image and subtracting the calibration image from the synthetic image.

The fingerprint detector may perform at least one image-processing among smoothing, binarization, and thinning on the valid regions or the synthetic image.

The fingerprint sensor may further include: a circuit element layer on the light blocking layer, the circuit element layer having at least one conductive layer constituting circuit elements; and a light emitting element layer on the circuit element layer, the light emitting element layer including light emitting elements.

One or more example embodiments of the present disclosure provide a fingerprint sensing method of a fingerprint sensor including a substrate, a light blocking layer that is on a first surface of the substrate and includes openings in a light blocking mask, and a sensor layer that is on a second surface of the substrate and includes photo sensors, the fingerprint sensing method including: storing a calibration image; generating an original image, based on sensing signals from the photo sensors; performing calibration on the original image by using the calibration image; and detecting a fingerprint, based on the calibrated image, wherein the calibration image is generated by synthetizing valid regions extracted from an original calibration image corresponding to the original image.

The valid regions may be regions generated based on sensing signals from first photo sensors from among the photo sensors configured to receive light through one opening.

The original calibration image may be generated based on sensing signals output from the photo sensors in response to light of a skin color.

The calibration image may be generated by extracting the valid regions in the original calibration image and putting together the valid regions.

The performing of the calibration may include: extracting the valid regions in the original image; generating a synthetic image by putting together the extracted valid regions; loading the calibration image; and subtracting the calibration image from the synthetic image.

The fingerprint sensing method may further include, before the loading of the calibration image, performing at least one image-processing among smoothing, binarization, and thinning on the valid regions or the synthetic image.

One or more example embodiments of the present disclosure provide a display device including: a substrate; a light blocking layer on a first surface of the substrate, the light blocking layer including openings in a light blocking mask; a circuit element layer on the light blocking layer, the circuit element layer having at least one conductive layer in which circuit elements are disposed; a light emitting element layer on the circuit element layer, the light emitting element layer including light emitting elements; a sensor layer on a second surface of the substrate, the sensor layer including photo sensors; and a fingerprint detector configured to generate an original image, based on sensing signals from the photo sensors, perform calibration on the original image by using a calibration image, and detect a fingerprint, based on the calibrated image, wherein the calibration image is generated by synthesizing valid regions extracted from an original calibration image corresponding to the original image.

The valid regions may be regions generated based on sensing signals from first photo sensors from among the photo sensors configured to receive light through one opening.

The original calibration image may be generated based on sensing signals output from the photo sensors in response to light of a skin color.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIGS. 10-12 are views illustrating a method of generating a white calibration image according to some embodiments of the present disclosure.

DETAILED DESCRIPTION

Figure 1:
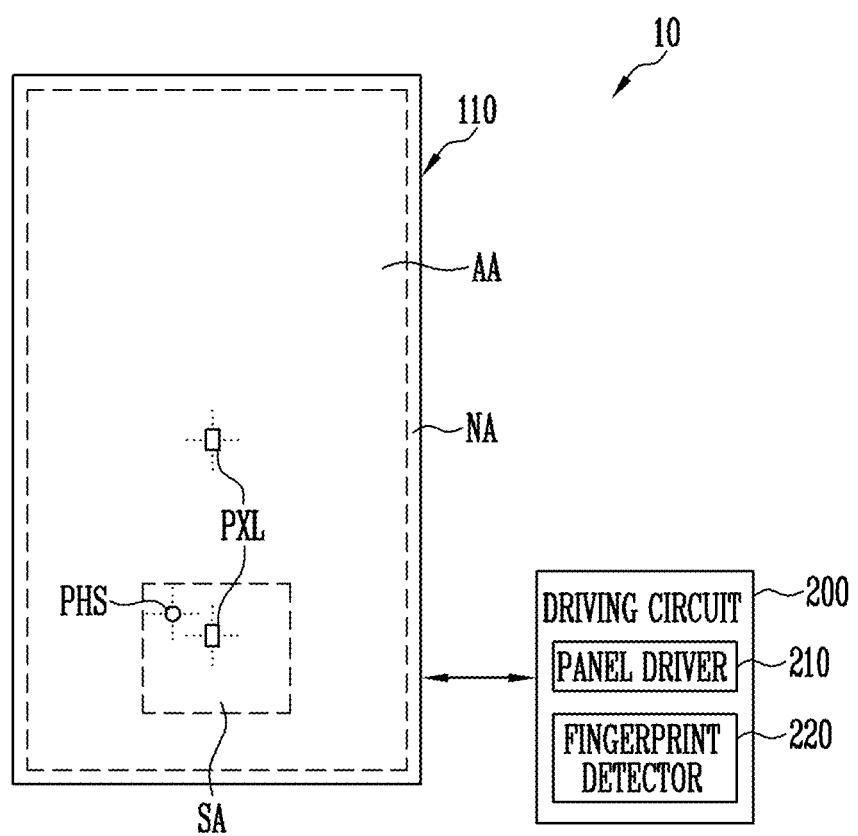
FIGS. 1 and 2 are schematic plan views illustrating a display device according to some embodiments of the present disclosure.

Hereinafter, exemplary embodiments of the present disclosure will be described in more detail with reference to the accompanying drawings. Throughout the drawings, the same reference numerals are given to the same elements, and their overlapping descriptions may be omitted.

Figure 2:
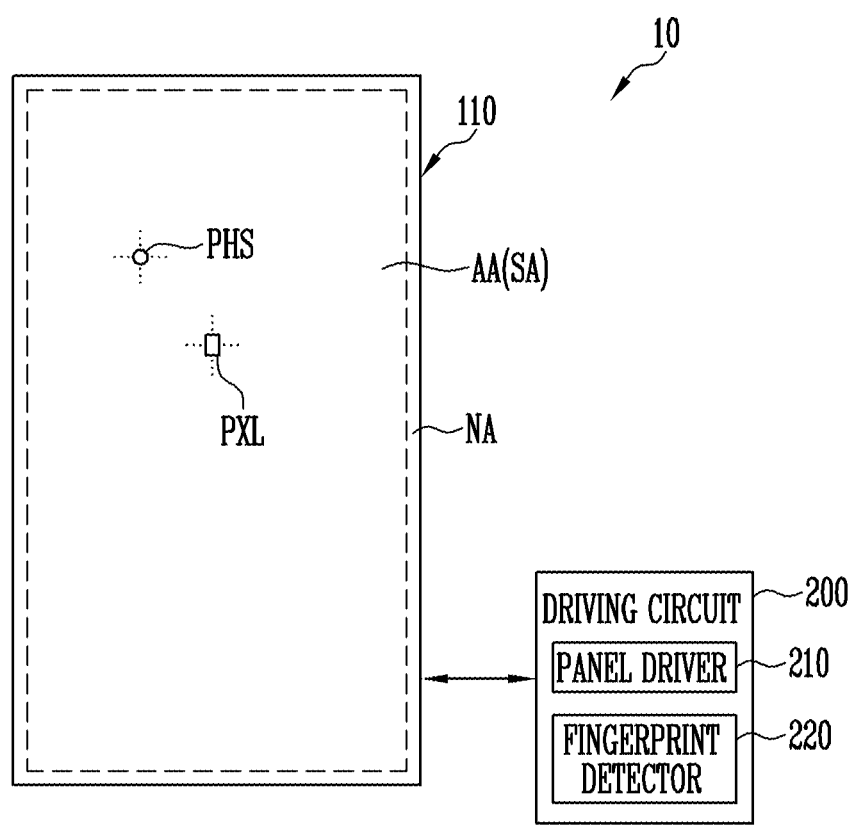

FIGS. 1 and 2 are plan views schematically illustrating a display device in accordance with some embodiments of the present disclosure. For example, FIGS. 1 and 2 are views schematically illustrating a display panel 110 provided in the display device 10 in accordance with some embodiments of the present disclosure and a driving circuit 200 for driving the display panel 110. Although the display panel 110 and the driving circuit 200 are separated from each other in FIGS. 1 and 2, the present disclosure is not limited thereto. For example, the whole or a portion of the driving circuit may be integrally implemented with the display panel 110 (e.g., on the display panel 110 as a monolithic structure).

Referring to FIGS. 1 and 2, the display device 10 includes a display panel 110 and a driving circuit 200 for driving the display panel 110.

The display panel 110 includes a display region AA and a non-display region NA. The display region AA, which may be referred to as an active region, is a region in which a plurality of pixels PXL, which may be referred to as sub-pixels, are provided. In some embodiments, each of the pixels PXL may include at least one light emitting element. The display device 10 drives the pixels PXL, corresponding to image data input from the outside, thereby displaying an image in the display region AA.

In some embodiments of the present disclosure, the display region AA may include a sensing region SA. The sensing region SA may include at least some pixels from among the pixels PXL provided in the display region AA.

In some embodiments, as shown in FIG. 1, at least a portion of the display region AA may be set as the sensing region SA. In some embodiments, as shown in FIG. 2, the whole of the display region AA may be set as the sensing region SA.

Although only one sensing region SA is formed on (or in) the display region AA in FIG. 1, embodiments of the present disclosure are not limited thereto. For example, in some embodiments, a plurality of sensing regions SA that are regularly or irregularly arranged may be formed on (or in) the display region AA. In some embodiments, the plurality of sensing regions SA may have areas and shapes, which are identical to or different from each other.

Although the sensing region SA is formed in at least a portion of the display region AA in FIG. 1, embodiments of the present disclosure are not limited thereto. For example, in some embodiments, the display region AA and the sensing region SA may be provided to overlap with each other in at least a partial region.

The non-display region NA is a region disposed at the periphery of the display region AA, and may be referred to as a non-active region. In some embodiments, the non-display region NA may inclusively mean the other region except the display region AA on the display panel 110. In some embodiments, the non-display region NA may include a line region, a pad region, various dummy regions, and the like.

In some embodiments of the present disclosure, the display device 10 may further include a plurality of photo sensors PHS provided in the sensing region SA. In some embodiments, each of the photo sensors PHS may sense reflected light generated when light emitted from a light source (e.g., a pixel PXL) is reflected by a finger of a user, and the display device 10 may sense a fingerprint of the finger of the user by analyzing the reflected lights. Hereinafter, although an example in which the photo sensors PHS are used for fingerprint sensing is described, the photo sensors PHS may be used to perform various functions of a touch sensor, a scanner, or the like.

In some embodiments of the present disclosure, the photo sensors PHS may be arranged or provided in the sensing region SA. The photo sensors PHS may overlap with at least some or all of the pixels PXL provided in the sensing region SA, or be arranged at the periphery of the pixels PXL. For example, at least some or all of the photo sensors PHS may be provided between the pixels PXL. Some embodiments of an arrangement relationship between the photo sensors PHS and the pixels PXL will be described in more detail with reference to FIGS. 3A-3E.

In some embodiments, the photo sensors PHS are provided adjacent to the pixels PXL, the photo sensors PHS may use, as a light source, a light emitting element provided in at least one pixel PXL disposed in the sensing region SA or at the periphery thereof. Therefore, the photo sensors PHS along with the pixels PXL of the sensing region SA, particularly, the light emitting elements provided in the pixels PXL may constitute a photosensitive type fingerprint sensor. As described above, when a display device having a built-in fingerprint sensor is configured using the pixels PXL as light sources, without any external light source, the module thickness of the photosensitive type fingerprint sensor and the display device having the same can be decreased, and manufacturing cost can be reduced.

In some embodiments, the photo sensors PHS may be arranged or provided on the other surface (e.g., a rear surface) opposing (e.g., facing away from) a surface (e.g., a front surface) on which an image is displayed among both surfaces of the display panel 110. However, embodiments of the present disclosure are not limited thereto.

The driving circuit 200 may drive the display panel 110. For example, the driving circuit 200 may output a data signal corresponding to image data to the display panel 110 or output a driving signal for the photo sensor PHS, and receive a sensing signal received from the photo sensor PHS. The driving circuit 200 receiving the sensing signal may detect a fingerprint (or fingerprint shape) of a user by using the sensing signal.

In some embodiments of the present disclosure, the driving circuit 200 may include a panel driver 210 and a fingerprint detector 220. Although the panel driver 210 and the fingerprint detector 220 are separated from each other in FIGS. 1 and 2, embodiments of the present disclosure is not limited thereto. For example, at least a portion of the fingerprint detector 220 may be integrated with the panel driver 210 or operate in connection with the panel driver 210.

The panel driver 210 may supply a data signal corresponding to image data to the pixels PXL while sequentially scanning the pixels PXL of the display region AA. Then, the display panel 110 may display an image corresponding to the image data.

In some embodiments, the panel driver 210 may supply a driving signal (e.g., a first driving signal) for fingerprint sensing to the pixels PXL. The driving signal may be provided to allow the pixels PXL to operate as light sources for the photo sensors PHS by emitting lights. Therefore, the driving signal for fingerprint sensing may be provided to pixels PXL provided in a specific region of the display panel 110, e.g., pixels PXL provided in the sensing region SA. In some embodiments, the driving signal for fingerprint sensing may be provided by the fingerprint detector 220.

The fingerprint detector 220 may provide or transfer a driving signal (e.g., a second driving signal) for driving the photo sensors PHS to the photo sensor PHS, and detect a fingerprint of a user, based on sensing signals received from the photo sensors PHS. A detailed fingerprint detection method of the fingerprint detector 220 will be described in detail below with reference to FIGS. 9-17.

FIGS. 3A-3E are plan views illustrating some embodiments of an arrangement structure of pixels and photo sensors. FIGS. 3A-3E illustrate different embodiments of relative sizes, resolutions, and arrangement relationships between at least one pixel PXL and photo sensors PHS, which are provided in the sensing region SA.

Figure 3A:
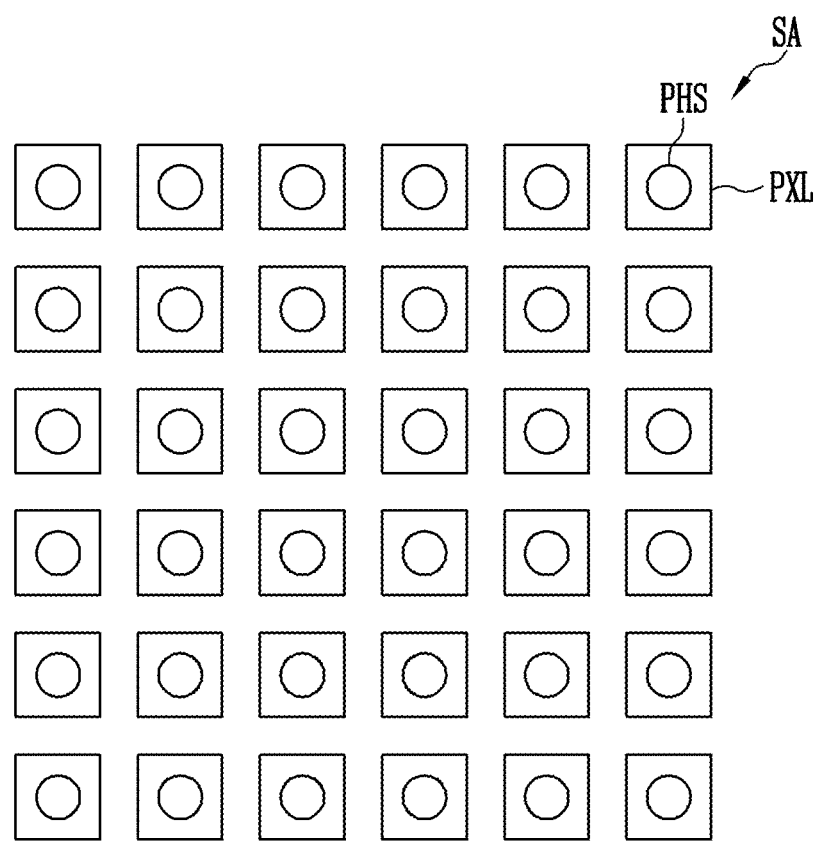
FIGS. 3A-3E are plan views illustrating an arrangement structure of pixels and photo sensors according to some embodiments of the present disclosure.

Referring to FIG. 3A, photo sensors PHS may be arranged with a resolution (density) equal to or substantially equal to that of pixels PXL in the sensing region SA. In other words, the photo sensors PHS of which number is equal to or substantially equal to that of the pixels PXL may be arranged in the sensing region SA. In some embodiments, the pixels PXL and the photo sensors PHS may be arranged to form pairs, respectively. In some embodiments as shown in FIG. 3A, a case where the pixels PXL and the photo sensors PHS are arranged to overlap with each other is illustrated. However, in some embodiments, the pixels PXL and the photo sensors PHS may be arranged not to overlap with each other or to overlap with each other only in one region.

Although the photo sensors PHS have a size smaller than that of the pixels PXL in FIG. 3A, embodiments of the present disclosure are not limited thereto. For example, each of the photo sensors may be larger than each of the pixels PXL as illustrated in FIG. 3C. In some embodiments, the photo sensors PHS may have a size equal to, substantially equal to, or larger than that of the pixels PXL.

Referring to FIGS. 3B-3E, photo sensors PHS may be arranged with a resolution lower than that of pixels PXL in the sensing region SA. In other words, a smaller (or lesser) number of the photo sensors PHS than the number of the pixels PXL may be arranged in the sensing region SA.

Although one photo sensor PHS is disposed per four pixels PXL in FIGS. 3B-3E, embodiments of the present disclosure are not limited thereto.

Figure 3B:
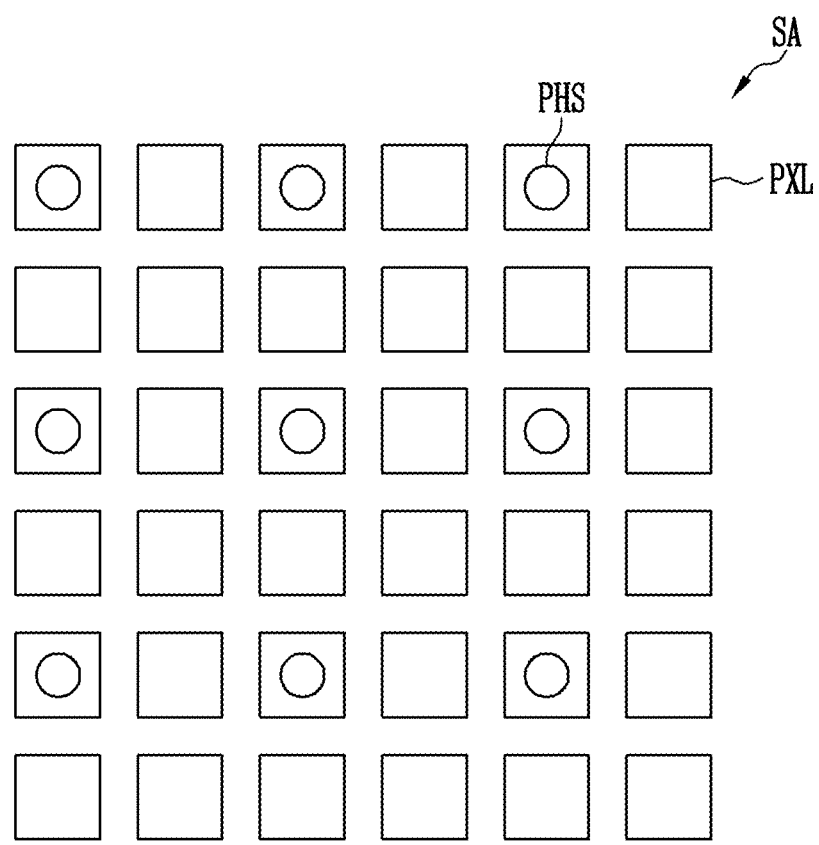
Figure 3C:
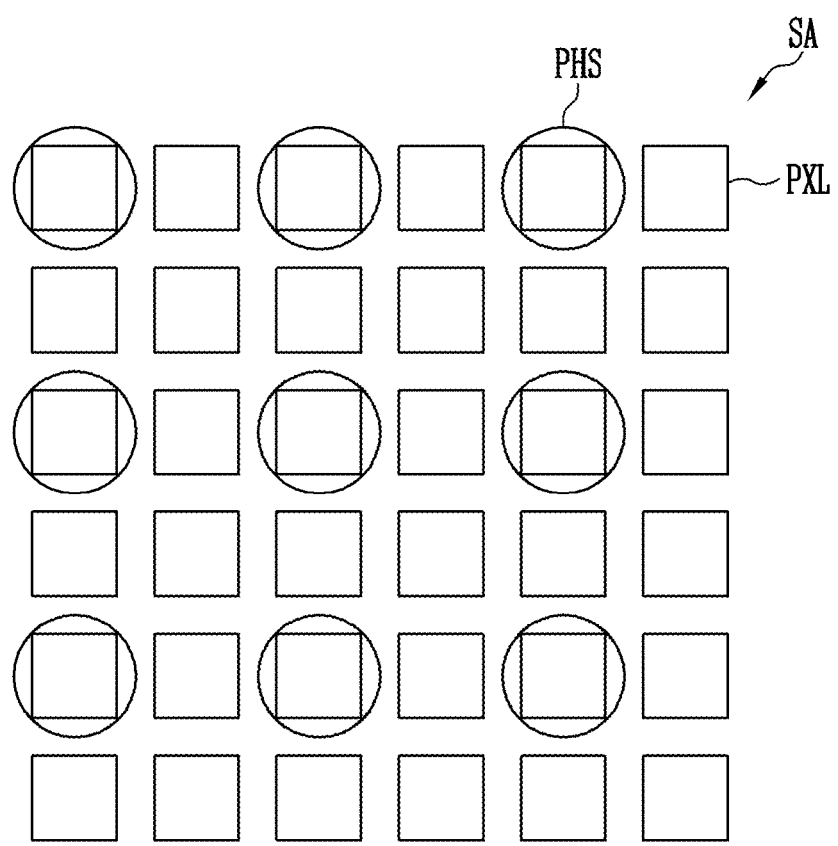
Figure 3D:
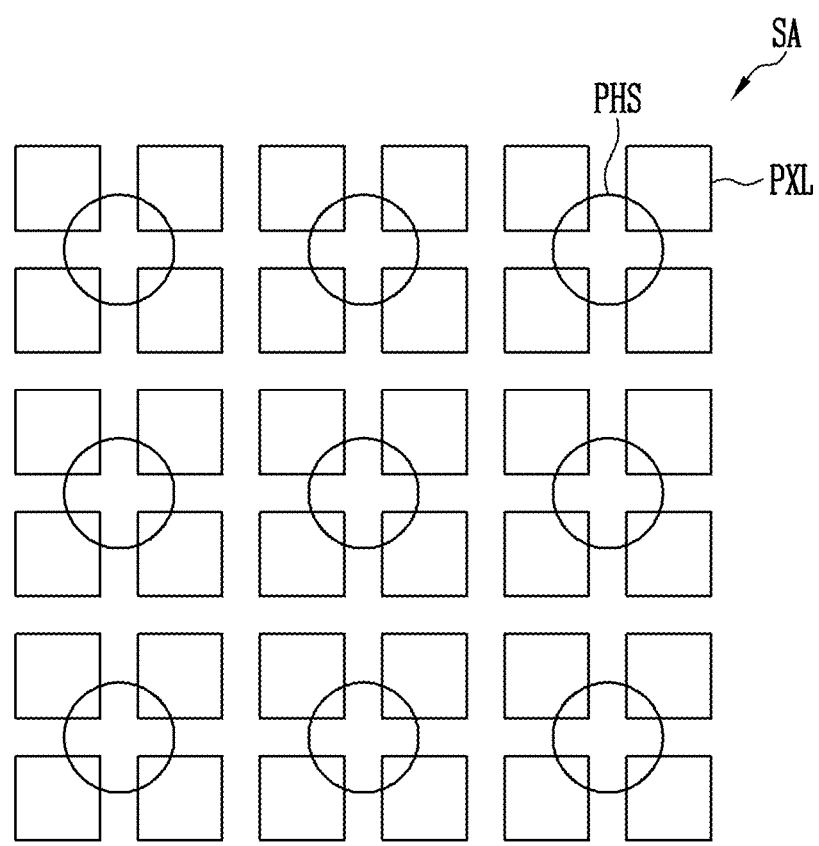
Figure 3E:
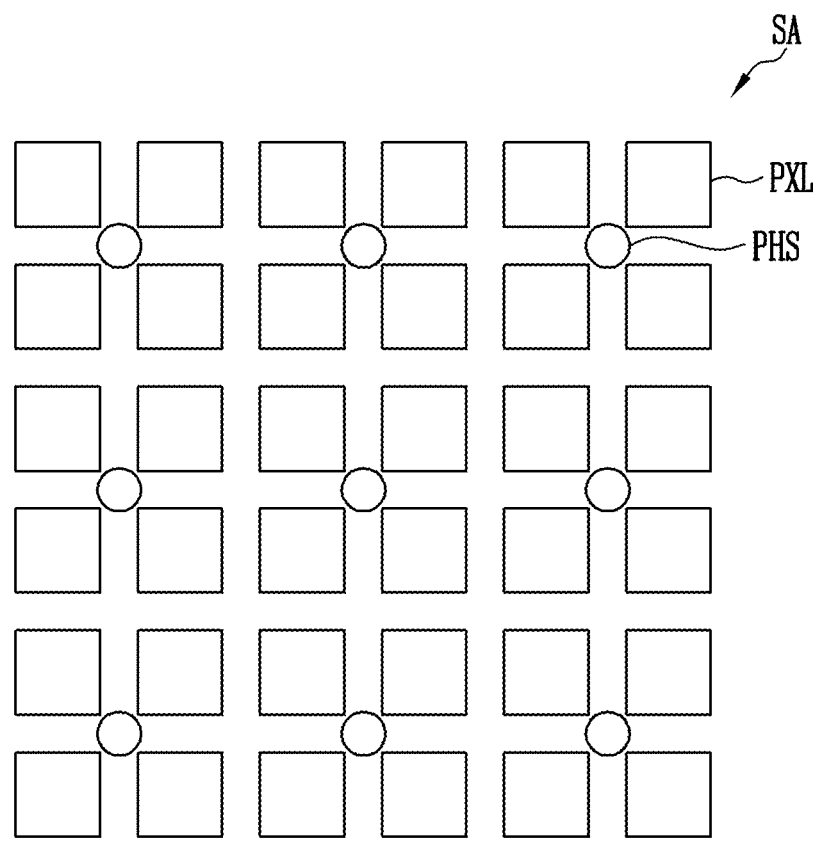

In some embodiments, the photo sensors PHS may have a size smaller than a size of the pixels PXL as shown in FIGS. 3B and 3E, or have a size larger than a size of the pixels PXL as shown in FIGS. 3C and 3D.

When the photo sensors PHS are arranged with a resolution lower than a resolution of the pixels PXL, some or all of the photo sensors PHS may be arranged to overlap with pixels PXL. For example, the photo sensors PHS may partially overlap with some of the pixels PXL as shown in FIGS. 3B and 3C.

In some embodiments, the photo sensors PHS may be disposed between the pixels PXL as shown in FIG. 3D to partially overlap with the pixels PXL. For example, one or more portions of each of the photo sensors PHS may overlap with one or more pixels PXL and one or more other portions of each of the photo sensors PHS may not overlap with one or more pixels PXL when viewed in a plan view as shown in FIG. 3D. In some embodiments, the photo sensors PHS (e.g., each of the photo sensors PHS) may have a size larger than that of the pixels PXL (e.g., each of the pixels PXL) as shown in FIG. 3D. For example, the photo sensors PHS (e.g., each of the photo sensors PHS) may have a size large enough to cover at least one pixel PXL.

In some embodiments, the photo sensors PHS may not overlap with the pixels PXL as shown in FIG. 3E. In some embodiments, no portion of the photo sensors PHS overlaps with the pixels PXL when viewed in a plan view as shown in FIG. 3E.

In some embodiments of the present disclosure, the arrangement structure between the pixels PXL and the photo sensors PHS is not limited to those described above. That is, the shapes, arrangements, relative sizes, numbers, and resolutions of the pixels PXL and of the photo sensors PHS in the sensing region SA may be variously modified in a suitable manner without departing from the technical concept of the present disclosure. Also, in some embodiments of the present disclosure, the pixels PXL and the photo sensors PHS may be arranged in a form obtained by combining one or more of the embodiments shown in FIGS. 3A-3E.

Although the photo sensors PHS are regularly arranged (e.g., arranged in a definite pattern) in the sensing region SA in FIGS. 3A-3E, embodiments of the present disclosure are not limited thereto. In some embodiments, the photo sensors PHS may be irregularly arranged in the sensing region SA.

Figure 4:
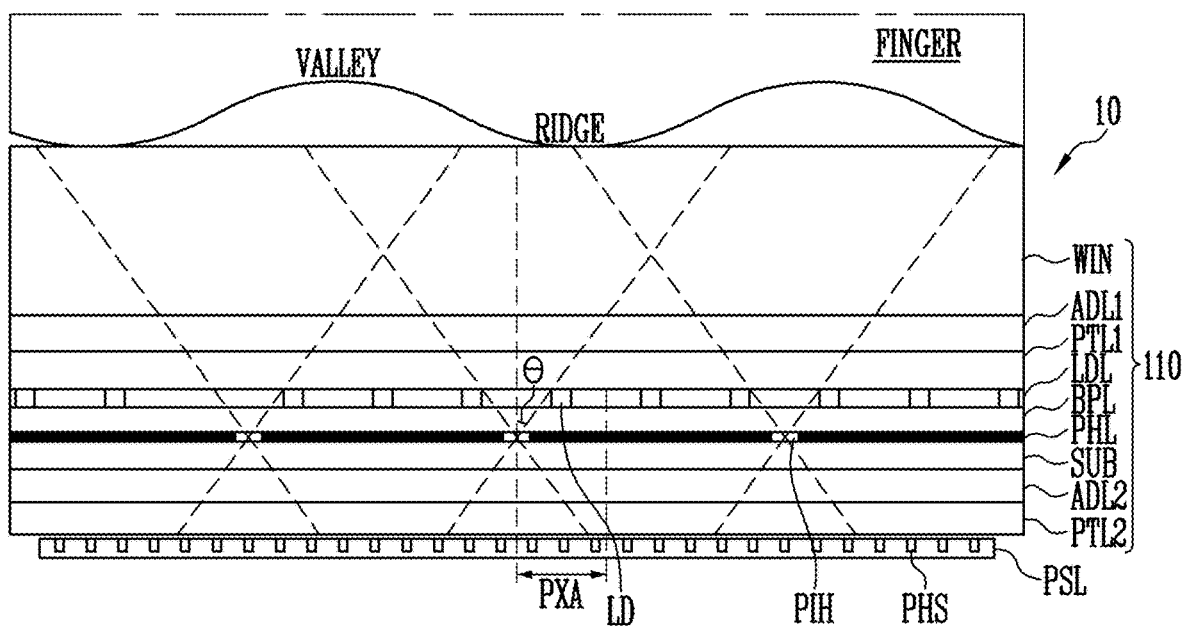
FIG. 4 is a schematic cross-sectional view of a display panel according to some embodiments of the present disclosure.

FIG. 4 is a schematic cross-sectional view of a display panel in accordance with some embodiments of the present disclosure. In particular, FIG. 4 illustrates a cross-sectional view of the display device 10 shown in FIGS. 1 and 2 in the sensing region SA.

Referring to FIG. 4, the sensing region SA of the display device 10 in accordance with some embodiments of the present disclosure may include the display panel 110 and a sensor layer PSL disposed on one surface of the display panel 110. Also, the display device 10 may include a substrate SUB, and a circuit element layer BPL, a light emitting element layer LDL, a first protective layer PTL1, a first adhesive layer ADL1, and a window WIN, which are sequentially disposed on one surface (e.g., an upper surface) of the substrate SUB. Also, the display device 10 may include a second adhesive layer ADL2 and a second protective layer PTL2, which are sequentially disposed on another surface (e.g., a lower surface) of the substrate SUB.

The substrate SUB is a base substrate of the display panel 110, and may be a transparent or substantially a transparent transmissive substrate. The substrate SUB may be a rigid substrate including glass or tempered glass, or a flexible substrate made of plastic. However, the material of the substrate SUB is not limited thereto, and the substrate SUB may be made of various suitable materials.

The substrate SUB may include a display region AA and a non-display region NA as shown in FIGS. 1 and 2. In some embodiments, the display region AA may include a plurality of pixel regions PXA in which the respective pixels PXL are disposed and/or formed.

The circuit element layer BPL may be disposed on the one surface of the substrate SUB, and include at least one conductive layer. For example, the circuit element layer BPL may include a plurality of circuit elements (e.g., at least one transistor and at least one capacitor) constituting pixel circuits of the pixels PXL and lines for supplying various power sources and signals for driving the pixels PXL. The circuit element layer BPL may include circuit elements and a plurality of conductive layers for constituting lines connected to the circuit elements. Also, the circuit element layer BPL may include at least one insulating layer provided between the plurality of conductive layers. Also, the circuit element layer BPL may include a line part disposed in the non-display region NA of the substrate SUB to supply corresponding power sources and corresponding signals to lines connected to the pixels PXL.

The light emitting element layer LDL may be disposed on one surface of the circuit element layer BPL. The light emitting element layer LDL may include a plurality of light emitting elements LD connected to the circuit elements and/or the lines of the circuit element layer BPL through contact holes, etc. In some embodiments, at least one of the plurality of light emitting elements LD may be disposed in each of the pixel regions PXA as shown in FIG. 4.

Each of the pixels PXL may include circuit elements disposed in the circuit element layer BPL and at least one light emitting element LD disposed in the light emitting element layer LDL on the top of the circuit element layer BPL. A structure of the pixel PXL may be described in detail later.

The first protective layer PTL1 may be disposed on the top of the light emitting element layer LDL to cover the display region AA. The first protective layer PTL1 may include an encapsulating member such as a thin film encapsulation (TFE) or an encapsulation substrate, and additionally include a protective film, and the like in addition to the encapsulating member.

The first adhesive layer ADL1 is disposed between the first protective layer PTL1 and the window WIN to couple the first protective layer PTL1 and the window WIN to each other. The first adhesive layer ADL1 may include a transparent adhesive such as an optically clear adhesive (OCA), and include various adhesive materials in addition to the transparent adhesive.

The window WIN is a protective member disposed at a module uppermost portion of the display device 10 including the display panel 110, and may be substantially a transparent transmissive substrate. The window WIN may have a multi-layered structure selected from a glass substrate, a plastic film, and a plastic substrate. The window WIN may include a rigid or flexible substrate, and the material constituting the window WIN is not particularly limited.

In some embodiments of the present disclosure, the display device 10 may further include a polarizing plate and/or a touch sensor layer (touch electrode layer). For example, the display device 10 may further include a polarizing plate and/or a touch sensor layer, disposed between the first protective layer PTL1 and the window WIN.

The second protective layer PTL2 may be disposed on the other surface of the substrate SUB. The second protective layer PTL2 may be coupled to the substrate SUB by the second adhesive layer ADL2.

The second adhesive layer ADL2 may firmly couple (or attach) the substrate SUB and the second protective layer PTL2 to each other. The second adhesive layer ADL2 may include a transparent adhesive such as an OCA. The second adhesive layer ADL2 may include a pressure sensitive adhesive (PSA) in which an adhesive material acts when pressure for allowing the second adhesive layer ADL2 to be adhered to an adhesive surface is applied. When the second adhesive layer ADL2 includes the PSA, the second adhesive layer ADL2 may be attached to the adhesive surface by using pressure without separate thermal treatment or UV treatment at room temperature.

In some embodiments of the present disclosure, the second adhesive layer ADL2 may include a material absorbing specific light or include a material blocking the specific light. In an example, the second adhesive layer ADL2 may include an infrared absorbing material absorbing infrared light having a high energy density or include an infrared blocking material blocking the infrared light.

The infrared absorbing material may include, for example, an inorganic based oxide such as Antimony Tin Oxide (ATO), Indium Tin Oxide (ITO), tungsten oxide, or carbon black, and/or a metal such as Ag. The inorganic based oxide may selectively transmit light of a visible region and absorb infrared light. Also, the infrared absorbing material may include, for example, an organic based dye. The organic base dye may be a dye used as a color filter provided in the display panel 110.

The infrared blocking material may be, for example, at least one selected from a borate mixture, a carbonate mixture, an alumina mixture, a nitrate mixture, a nitrite mixture, lithium borate, potassium borate, magnesium borate, calcium borate, strontium borate, barium borate, sodium borate, $Na_2B_4O_x$, colemanite, lithium carbonate, sodium carbonate, potassium carbonate, calcium carbonate, calcite, $CaCO_3$, dolomite, and/or magnesite. Also, the infrared blocking material may be at least one selected from one or more dyes selected from nickel dithiol based, dithiol based metal complex compounds, cyanine based, squarylium based, croconium based, diimmonium based, aminium based, ammonium based, phthalocyanine based, naphthalocyanine based, anthraquinone based, naphthoquinone based, polymer condensation azo-based pyrrole, polymethine-based, and/or propylene-based.

When a hand (or finger) of a user is mounted (or located) on a display surface (e.g., one surface on which an image is displayed) of the display device 10, the display device 10 may perform a function of sensing a fingerprint of the user through photo sensors PHS which may be described later. When external light introduced to the display device 10 while the display device 10 is sensing the fingerprint of the user, a visible region in the external light is blocked by the hand of the user, but infrared light may be transmitted through the hand of the user and then incident into (e.g., on) the photo sensors PHS. The infrared light incident into (e.g., on) the photo sensors PHS serves as noise, and therefore, the recognition accuracy of light reflected by the hand of the user may be decreased.

In the above-described embodiment of the present disclosure, when the second adhesive layer DAL2 includes the infrared absorbing material and/or the infrared blocking material, the infrared light is absorbed and/or blocked by the second adhesive layer ADL2 even though the infrared light of the external light is transmitted through the hand of the user. Hence, the infrared light is not incident into (e.g., on) the photo sensors PHS, and thus the recognition accuracy of the fingerprint of the user can be improved.

The second protective layer PTL2 prevents or substantially prevents oxygen and moisture from being introduced thereto from the outside, and may be provided in the form of a single layer or multi-layer. The second protective layer PTL2 may be configured in a film form, to further ensure flexibility of the display panel 110. The second protective layer PTL2 may be coupled to the sensor layer PSL through another adhesive layer including a transparent adhesive such as an OCA.

In some embodiments, a selective light blocking film may be further provided on the bottom of the second protective layer PTL2. The selective light blocking film blocks a specific frequency region (e.g., ultraviolet light in external light introduced to the display device 10) to prevent or substantially prevent the corresponding light from being incident into (e.g., on) photo sensors PHS. Although the selective light blocking film is described as provided on the bottom of the second protective layer PTL2, embodiments of the present disclosure are not limited thereto. For example, in some embodiments, the selective light blocking film may be provided in any layer of the display device 10 as long as the selective light blocking film is disposed on the top of the sensor layer PSL. In some embodiments, when a component for blocking the ultraviolet light is included in the display panel 110, the selective light blocking film may be omitted.

A light blocking layer PHL may be disposed between the light emitting element layer LDL and the sensor layer PSL which may be described later. For example, the light blocking layer PHL may be disposed between the substrate SUB and the circuit element layer BPL as shown in FIG. 4. In some embodiments of the present disclosure, the light blocking layer PHL may include a plurality of pin holes PIH. The light blocking layer PHL blocks lights incident from the outside (e.g., some of reflected lights reflected from a finger), and therefore, only the others of the reflected lights reaches a lower layer through the pin holes PIH.

A width (or diameter) of the pin holes PIH may be configured such that light satisfying an observation view of a set (e.g., predetermined) angle range (or referred to as "field of view (FOV) θ") can be transmitted through each pin hole PIH.

Also, the width (or diameter) of the pin holes PIH may be set to about ten times of the wavelength of reflected light (e.g., about 4 μm or about 5 μm) such that diffraction of light can be prevented or reduced. Also, the width of the pin holes PIH may be set large enough to prevent or reduce image blur and to more clearly sense the shape of a fingerprint. For example, the width of the pin holes PIH may be set to about 20 μm or less. However, the present disclosure is not limited thereto, and the width of the pin holes PIH may vary depending on a wavelength band of reflected light and/or a module thickness for each layer.

A distance (or pitch) between adjacent pin holes PIH may be set by considering a distance between the light blocking layer PHL and the sensor layer PSL and a wavelength range of reflected light. For example, the distance between the adjacent pin holes PIH may be set to twice or more of that between the light blocking layer PHL and the sensor layer PSL which may be described later. The distance between the adjacent pin holes PIH may be set to no less than a value obtained by adding a set (e.g., predetermined) error range to the distance between the light blocking layer PHL and the sensor layer PSL. Thus, images observed by the respective photo sensors PHS can be prevented or substantially prevented from overlapping with each other, and accordingly, the image blur can be prevented or reduced.

The sensor layer PSL may be attached to the other surface (e.g., the rear surface) of the display panel 110 to overlap with at least one region of the display panel 110. The sensor layer PSL may be disposed to overlap with the display panel 110 in the display region AA. The sensor layer PSL may include a plurality of photo sensors PHS distributed at a set (e.g., predetermined) resolution and/or a set (e.g., predetermined) distance. A distance between the photo sensors PHS may be densely set such that reflected light reflected from an observation object (e.g., a specific region of a finger, such as a fingerprint region) can be incident into at least two adjacent photo sensors PHS.

The photo sensors PHS of the sensor layer PSL may receive reflected lights passing through the pin holes PIH, and output electrical signals corresponding to the reflected lights as sensing signals. Reflected lights incident into the respective photo sensors PHS may have different optical characteristics (e.g., frequencies, wavelengths, sizes, etc.), based on whether the reflected lights are caused by valleys or ridges of a fingerprint formed on a finger of a user. Therefore, the photo sensors PHS may output sensing signals having different electrical characteristics, corresponding to the optical characteristics of the reflected lights. The sensing signals output by the photo sensors PHS may be converted into an original image, in some embodiments, sensor image, sensor data, and/or sensor image data may be used for fingerprint identification of the user.

As described above, the display device 10 in accordance with the present disclosure has a fingerprint sensor including the light emitting element layer LDL, the sensor layer PSL, and the light blocking layer PHL. The light emitting element layer LDL may include the light emitting elements LD capable of serving as a light source of a photosensitive type fingerprint sensor. The sensor layer PSL may include the photo sensors PHS for receiving reflected light that is emitted from the light emitting element layer LDL and then reflected from an object (e.g., a fingerprint region of the finger) located on the top of the display device 10. The light blocking layer PHL may include the pin holes PIH disposed between the light emitting element layer LDL and the sensor layer PSL to allow reflected lights to be selectively transmitted therethrough.

In some embodiments, the fingerprint sensor may further include an optical opening region formed in the display panel 110, etc. (e.g., formed in the circuit element layer BPL and the light emitting element layer LDL) so as to reduce loss of reflected light incident into each pin hole PIH within a set (e.g., predetermined) range of FOV. Also, in order to more easily control the FOV, the fingerprint sensor may include a light control layer disposed in the display panel 110 to control a light path. Some embodiments of the light control layer will be described below with reference to FIGS. 6-8.

In some embodiments, the display device 10 uses the light emitting elements LD of the pixels PXL as the light source of the fingerprint sensor, but the present disclosure is not limited thereto. For example, a display device in accordance with some embodiments of the present disclosure may have a separate light source for fingerprint sensing.

The fingerprint sensing method of the display device 10 in accordance with the above-described embodiment may be briefly described as follows. During a fingerprint sensing period in which the photo sensors PHS are activated, the pixels PXL (particularly, the light emitting elements LD provided in the pixels PXL) of the display region AA may emit lights in a state in which a finger (e.g., a fingerprint region) of a user is in contact with or comes close to the display region AA. For example, all the pixels PXL of the display region AA may simultaneously (e.g., concurrently) or sequentially emit lights during the fingerprint sensing period. In some embodiments, only some pixels PXL among the pixels PXL of the display region AA emit lights at a set (e.g., predetermined) distance, or only some pixels PXL radiating lights of a specific color (e.g., short-wavelength light such as blue light) may selectively emit lights.

Some of lights emitted from the pixels PXL may be reflected from the finger of the user and then incident into the photo sensors PHS by passing through the optical opening region formed in each layer of the display device 10 and the pin holes PIH. A fingerprint shape (fingerprint pattern) of the user may be detected based on differences in light amount and/or waveforms of reflected lights respectively reflected from ridges and valleys of the fingerprint.

In some embodiments, as shown in FIG. 4, only at least some of the photo sensors PHS disposed in the sensor layer PSL may receive incident light according to a size (e.g., width) of the pin holes PIH and/or a FOV θ. In some embodiments, only sensing signals output by photo sensors that actually receive reflected lights among sensing signals output by the photo sensors PHS may be used as valid sensing signals for fingerprint detection. Sensing signals output by photo sensors PHS that do not receive reflected lights blocked by the pin holes PIH may include invalid information corresponding to only black.

In some embodiments, one or more of the photo sensors PHS disposed in the sensor layer PSL may receive reflected light from one pin hole PIH, and other ones of the photo sensors PHS may receive reflected lights from at least two pin holes PIH. In some embodiments, only sensing signals output by photo sensors PHS that receive reflected light from one pin hole PIH may be used as valid sensing signals for fingerprint detection. Sensing signals output by photo sensors PHS that receive reflected lights from a plurality of pin holes PIH may include inaccurate information due to mutual interference between the received reflected lights.

Therefore, the fingerprint detector 220 shown in FIGS. 1 and 2 may extract a valid region generated based on valid sensing signals in an original image generated from sensing signals, and detect a fingerprint, based on the extracted valid region. For example, the fingerprint detector 220 may extract valid regions in the original image generated based on the sensing signals, and synthesize the extracted valid regions by performing image-processing on the valid regions. Each of the valid regions may be defined as a region, partial image, or a portion of sensor data generated based on sensing signals of photo sensors PHS that receive reflected light through one pin hole PIH in the original image (or sensor data) generated from the sensing signals output by the photo sensors PHS.

A fingerprint detection method of the fingerprint detector 220 may be described in more detail below with reference to FIGS. 9-17.

Figure 5:
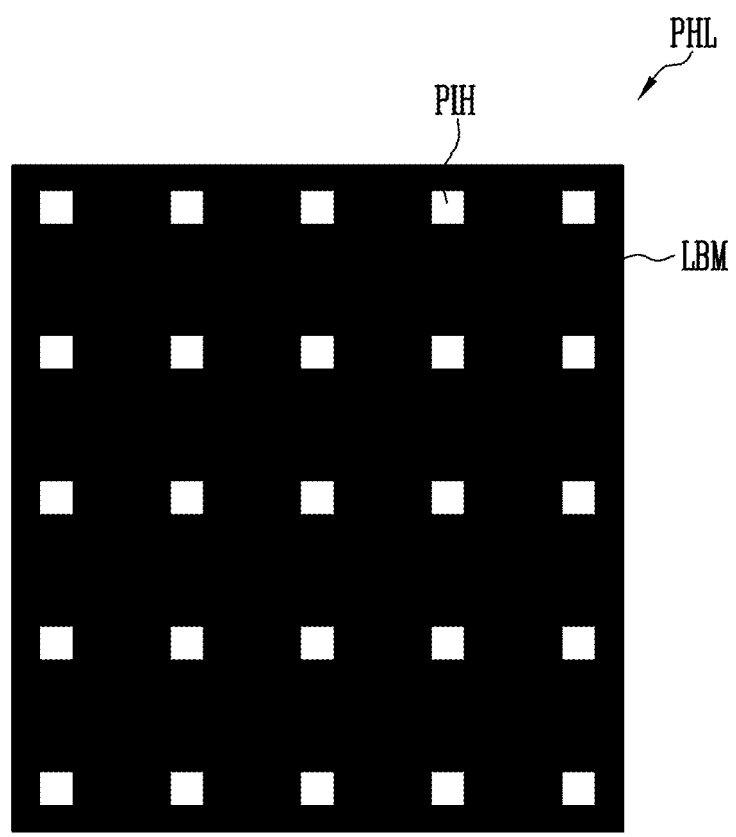
FIG. 5 is a plan view illustrating a light blocking layer according to some embodiments of the present disclosure.

FIG. 5 is a plan view illustrating a light blocking layer in accordance with some embodiments of the present disclosure.

Referring to FIG. 5, the light blocking layer PHL in accordance with some embodiments of the present disclosure may include a light blocking mask LBM and a plurality of pin holes PIH distributed in the light blocking mask LBM.

The light blocking mask LBM may be made of a light blocking material and/or a light absorbing material. For example, the light blocking mask LBM may be configured with an opaque metal layer (conductive layer) locally opened in a region in which each pin hole PIH is disposed. However, the material constituting the light blocking mask LBM is not limited to metal, and the light blocking mask LBM may be made of various materials capable of blocking transmission of light. For example, the light blocking mask LBM may be made of a black matrix material currently known in the art or any other suitable material.

The pin holes PIH may be openings distributed in the light blocking mask LBM. The pin holes PIH may be distributed in a uniform, substantially uniform, or irregular pattern in the light blocking mask LBM to have a certain size and distance. Also, the pin holes PIH may be arranged with a resolution lower than a resolution of the photo sensors PHS arranged in the sensor layer PSL. However, the present disclosure is not limited thereto, and the size, number, resolution, and/or arrangement structure of the pin holes PIH may be variously modified in a suitable manner.

Although the pin holes PIH have a rectangular shape in FIG. 5, embodiments of the present disclosure are not limited thereto. For example, in some embodiments, the pin holes PIH may have various shapes such as a rectangular shape, a circular shape, an elliptical shape, and a polygonal shape.

In the display device 10 shown in FIG. 4, the light blocking layer PHL may be disposed between the light emitting element layer LDL in which the light emitting elements LD are arranged and the sensor layer PSL in which the photo sensors PHS are arranged. The light blocking layer PHL may constitute an optical system for allowing only some lights to be selectively transmitted therethrough and blocking the other light.

The light blocking layer PHL along with the photo sensors PHS described above may constitute a finger print sensor. Also, the light blocking layer PHL may be integrally formed with the circuit element layer of the display panel 110. Thus, the module thickness of the photosensitive type fingerprint sensor and the display device having the same can be decreased or be minimized or reduced.

Figure 6:
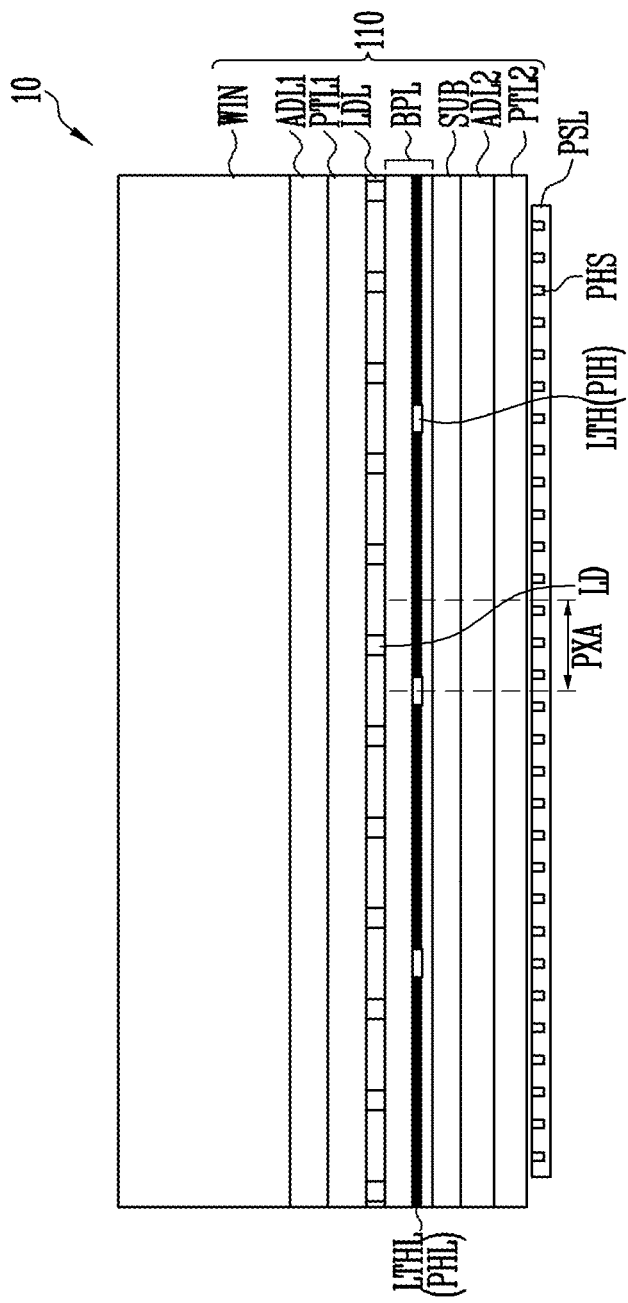
FIG. 6 is a schematic cross-sectional view of a display panel according to some embodiments of the present disclosure.
Figure 7:
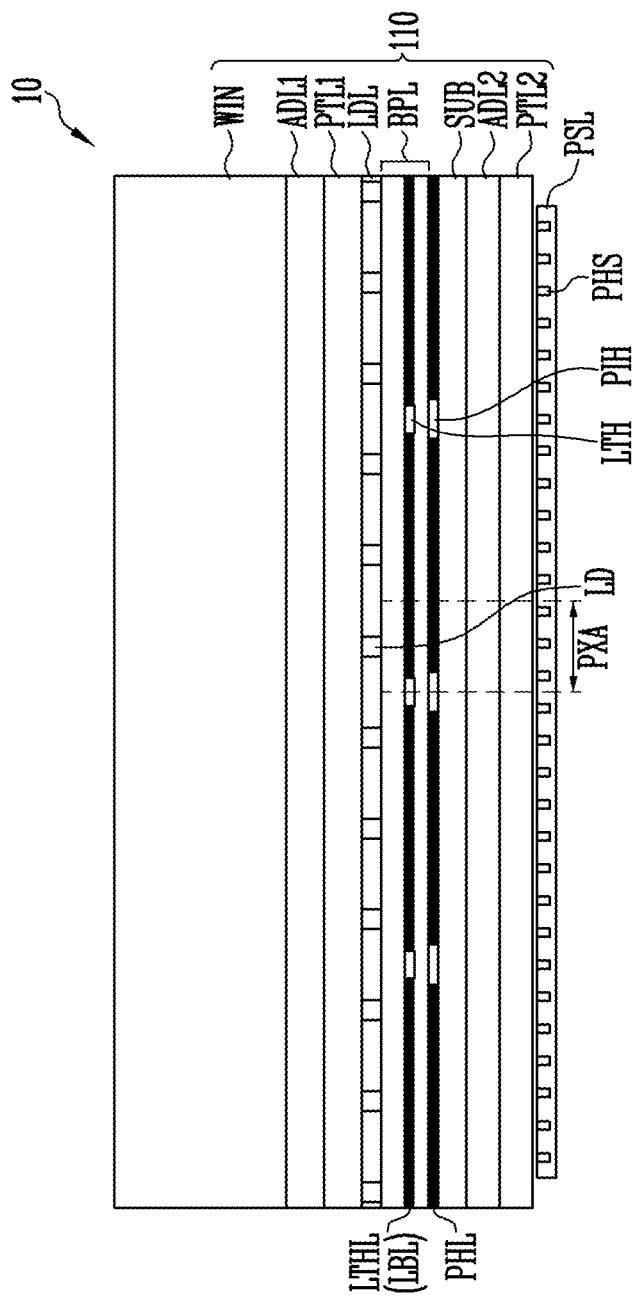
FIG. 7 is a schematic cross-sectional view of a display panel according to some embodiments of the present disclosure.
Figure 8:
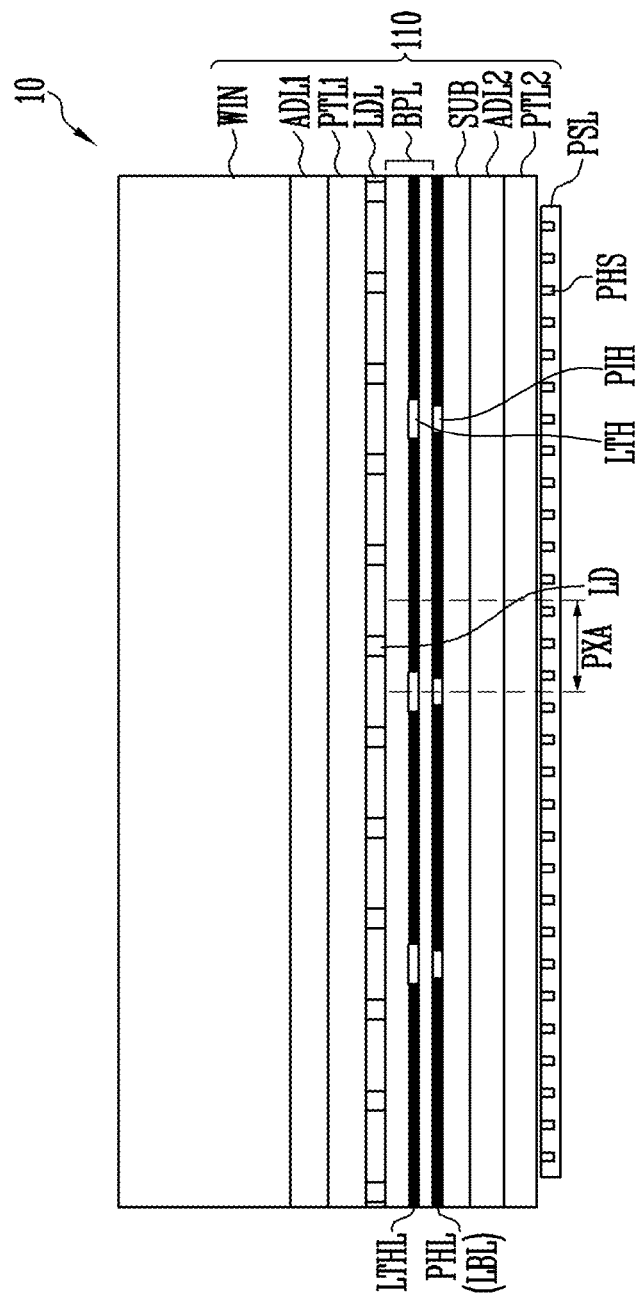
FIG. 8 is a schematic cross-sectional view of a display panel according to some embodiments of the present disclosure.

FIG. 6 is a schematic cross-sectional view of a display panel in accordance with some embodiments of the present disclosure. FIG. 7 is a schematic cross-sectional view of a display panel in accordance with some embodiments of the present disclosure. FIG. 8 is a schematic cross-sectional view of a display panel in accordance with some embodiments of the present disclosure. In FIGS. 6-8, detailed descriptions of components similar or identical to those at least one of the above-described embodiments may be omitted.

Referring to FIG. 6, the circuit element layer BPL may include a light transmitting hole array layer LTHL provided or disposed in the sensing region SA. For example, the light transmitting hole array layer LTHL may include a plurality of light transmitting holes LTH distributed in the circuit element layer BPL. In some embodiments, the light transmitting hole array layer LTHL may be provided in substitution for the light blocking layer PHL. That is, the light transmitting holes LTH may respectively serve as the pin holes PIH.

When the pin holes PIH are configured using the plurality of light transmitting holes LTH distributed in the circuit element layer BPL, without separately providing the light blocking layer PHL as shown in FIG. 6, a separate mask process to form the light blocking layer PHL may be omitted. In addition, the display device in accordance with some embodiment shown in FIG. 6 can prevent or reduce an increase in thickness, which is caused when the light blocking layer PHL is separately provided. Further, manufacturing cost can be reduced, and process efficiency can be improved.

Referring to FIGS. 7 and 8, the circuit element layer BPL may include a light transmitting hole array layer LTHL including a plurality of light transmitting hole LTH. In some embodiments, a light blocking layer PHL including a plurality of pin holes PIH may be disposed between the substrate SUB and the circuit element layer BPL. The light transmitting holes LTH and the pin holes PIH may be arranged such that at least some of the light transmitting holes LTH and the pin holes PIH overlap with each other.

In some embodiments of the present disclosure, the light transmitting holes LTH and the pin holes PIH may have sizes equal to, substantially equal to, or different from each other. For example, the light transmitting holes LTH may have a width (or diameter) smaller than that of the pin holes PIH as shown in FIG. 7. For example, the light transmitting holes LTH and the pin holes PIH have a width (or diameter) ranging from 5 μm to 20 μm, and the width (or diameter) of the light transmitting holes LTH may be smaller than that of the pin holes PIH.

In some embodiments, the light transmitting holes LTH have a size smaller than that of the pin holes PIH. Therefore, the light transmitting hole array layer LTHL may serve as a light control layer LBL for controlling the path of light (e.g., limiting the FOV of reflected light to a set (e.g., predetermined) angle range), and the light blocking layer PHL may perform a light blocking function.

In contrast to FIG. 7, in some embodiments, the light transmitting holes LTH may have a width (or diameter) greater than that of the pin hole PIH as shown in FIG. 8. In some embodiments, the light transmitting hole array layer LTHL may perform a light blocking function, and the light blocking layer PHL may serve as the light control layer LBL for controlling the path of light.

Figure 9:
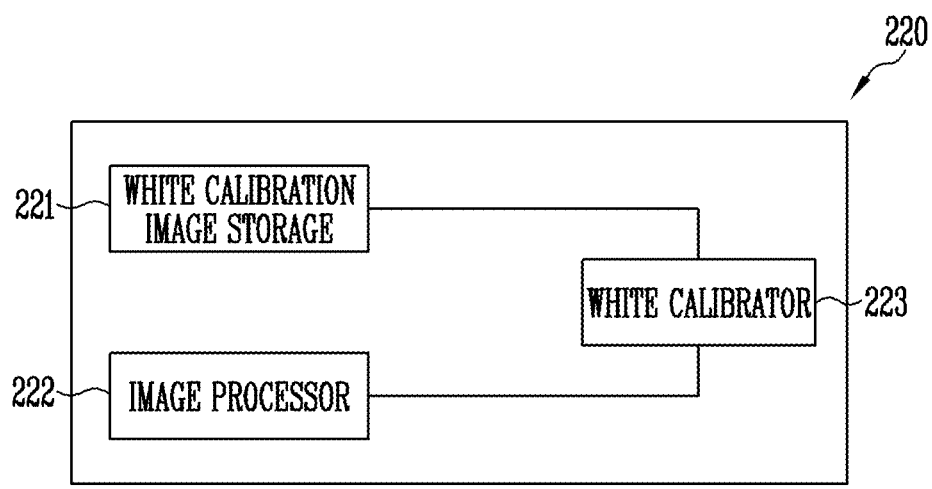
FIG. 9 is a block diagram illustrating a configuration of a fingerprint detector according to some embodiments of the present disclosure.
Figure 10:
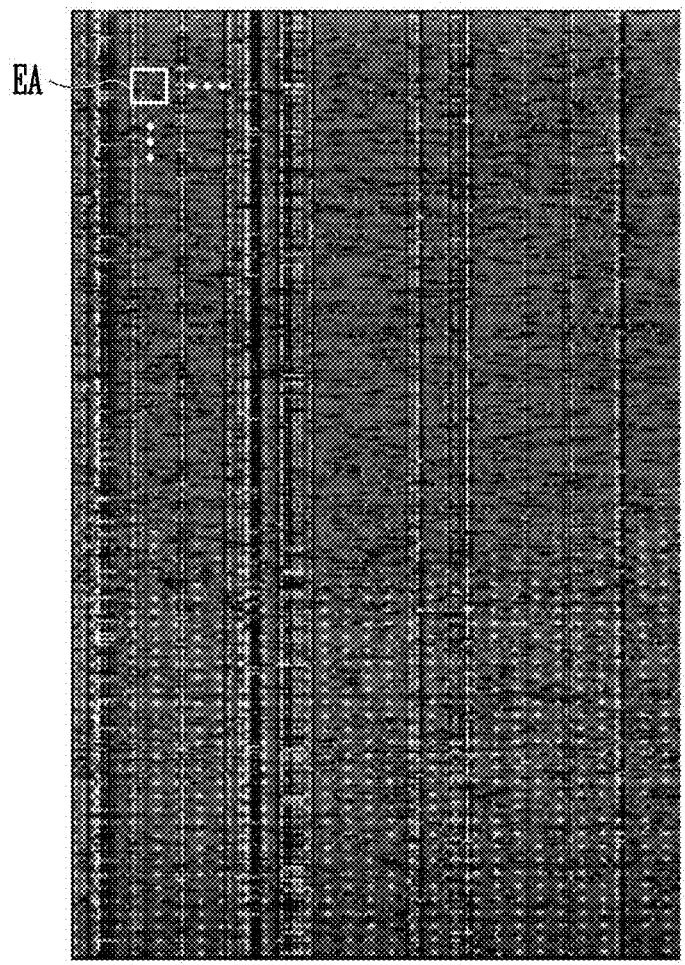

FIG. 9 is a block diagram illustrating a configuration of a fingerprint detector in accordance with some embodiments of the present disclosure. FIGS. 10-12 are views illustrating a method of generating a white calibration image in accordance with some embodiments of the present disclosure. FIGS. 13-17 are views illustrating a processing method of an original image in accordance with some embodiments of the present disclosure.

Referring to FIG. 9, the fingerprint detector 220 in accordance with some embodiments of the present disclosure may include a white calibration image storage 221 (or calibration data storage), an image processor 222, and a white calibrator 223 (or calibrator). Although the components are independent from each other in FIG. 9, embodiments of the present disclosure are not limited thereto. In some embodiments, at least some of the white calibration image storage 221, the image processor 222, and the white calibrator 223 may be integrated as one component or be separated into more than one component. In some embodiments, the white calibration image storage 221 may be a storage device separately provided at the outside (e.g., the panel driver 210 shown in FIGS. 1 and 2, etc.) of the fingerprint detector 220.

The white calibration image storage 221 may store a white calibration image (or calibration data) used for white calibration. The white calibration may be defined as a calibration operation of removing a noise, error, or deviation generated in an original image due to a process deviation of the photo sensor PHS (see FIG. 4), the pin hole PIH (see FIG. 4), the optical opening region, etc., thereby ensuring uniformity of the photo sensors PHS in the sensor layer PSL (see FIG. 4). The white calibration image may be stored in the white calibration image storage 221 before the display device 10 having the fingerprint detector 220 is initially driven (e.g., before a product is released).

In some embodiments, the white calibration image may be generated using the following method. First, an original white calibration image (i.e., calibration data about all the photo sensors PHS) as shown in FIG. 10 may be generated based on sensing signals output from the photo sensors PHS by sensing light of a color (e.g., a skin color) of an object to be detected on the display panel 110. A sensing signal received from one photo sensor PHS may be converted to constitute one pixel in the original white calibration image (or to constitute a value corresponding to the one pixel).

In some embodiments, the original white calibration image may be generated by converting sensing signals output from the photo sensors PHS into image data in a state in which an object having a skin color or an object having a specific reflectivity (e.g., a reflectivity of about 70%) is disposed on the display panel 110. In some embodiments, the original white calibration image may be generated by converting sensing signals output from the photo sensors PHS into image data in a state in which light of a skin color is irradiated onto the display panel 110. The original white calibration image may include a noise or error (e.g., a noise with respect to a color of an object to be detected) caused by a process deviation of the photo sensor PHS (see FIG. 4), etc.

As described with reference to FIG. 4, only some photo sensors PHS that substantially receive reflected lights or receive reflected light from one pin hole PIH among the photo sensors PHS may output valid sensing signals. In some embodiments, the original white calibration image may be processed such that a valid region EA generated based on the valid sensing signals remains.

Specifically, valid regions EA may be extracted from the original white calibration image as shown in FIG. 11. Only some of the valid regions EA extracted from the original white calibration image shown in FIG. 10 are exemplarily illustrated in FIG. 11. The valid region EA may mean a region, partial image, or a portion of sensor data generated based on sensing signals of photo sensors PHS that receive reflected light through one pin hole PIH in the original white calibration image.

The extracted valid regions EA may be synthesized, to generate a final white calibration image. For example, the extracted valid regions EA may be put together (or stitched together), to be combined as one image as shown in FIG. 12.

In some embodiments, when the valid regions EA are synthesized, image interpolation may be applied to pixels included in edge regions that are put together. For example, the image interpolation may be performed by calculating a mean value of image data of a corresponding pixel and an adjacent pixel. In some embodiments, the image interpolation may be performed using an original white calibration image of an invalid region instead of the valid image EA. The image interpolation may be performed in various methods known in the art, and is not limited to a specific method.

Because the final white calibration image generated in accordance with some embodiments of the present disclosure as shown in FIG. 12 is generated using only the extracted valid regions EA, the final white calibration image has a capacity smaller than that of the original white calibration image shown in FIG. 10. Thus, the fingerprint sensor in accordance with the present disclosure can decrease a storage space required to store the white calibration image. Further, because the final white calibration image generated in accordance with the present disclosure has a small capacity, a loading time of the white calibration image can be decreased when white calibration is performed using the final white calibration image.

The image processor 222 may generate an original image (or sensor data), based on sensing signals received from the outside (e.g., the photo sensors PHS) and perform image-processing on the original image. As described with reference to FIG. 4, during the fingerprint sensing period, the pixels PXL of the display region AA (or sensing region SA) emit lights, some of the lights are reflected from a finger of a user, and the reflected lights are incident into the photo sensors PHS through the pin holes PIH. Sensing signals from photo sensors PHS receiving the reflected lights may be provided to the image processor 222.

Figure 13:
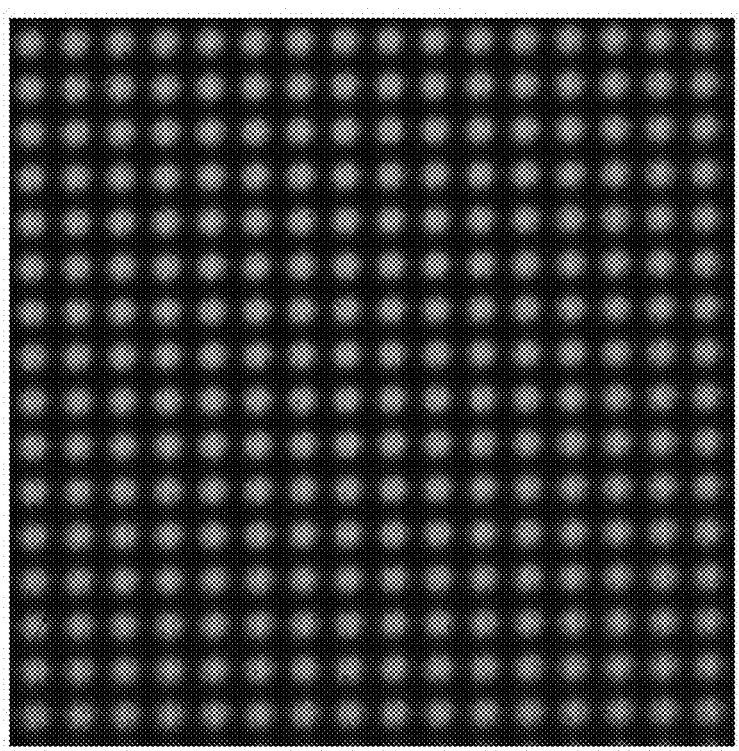
FIGS. 13-17 are views illustrating a processing method of an original image according to some embodiments of the present disclosure.

Specifically, the image processor 222 may convert the sensing signals received from the photo sensors PHS into an original image as shown in FIG. 13. A sensing signal received from one photo sensor PHS may be converted to constitute one pixel in the original image.

Figure 14:
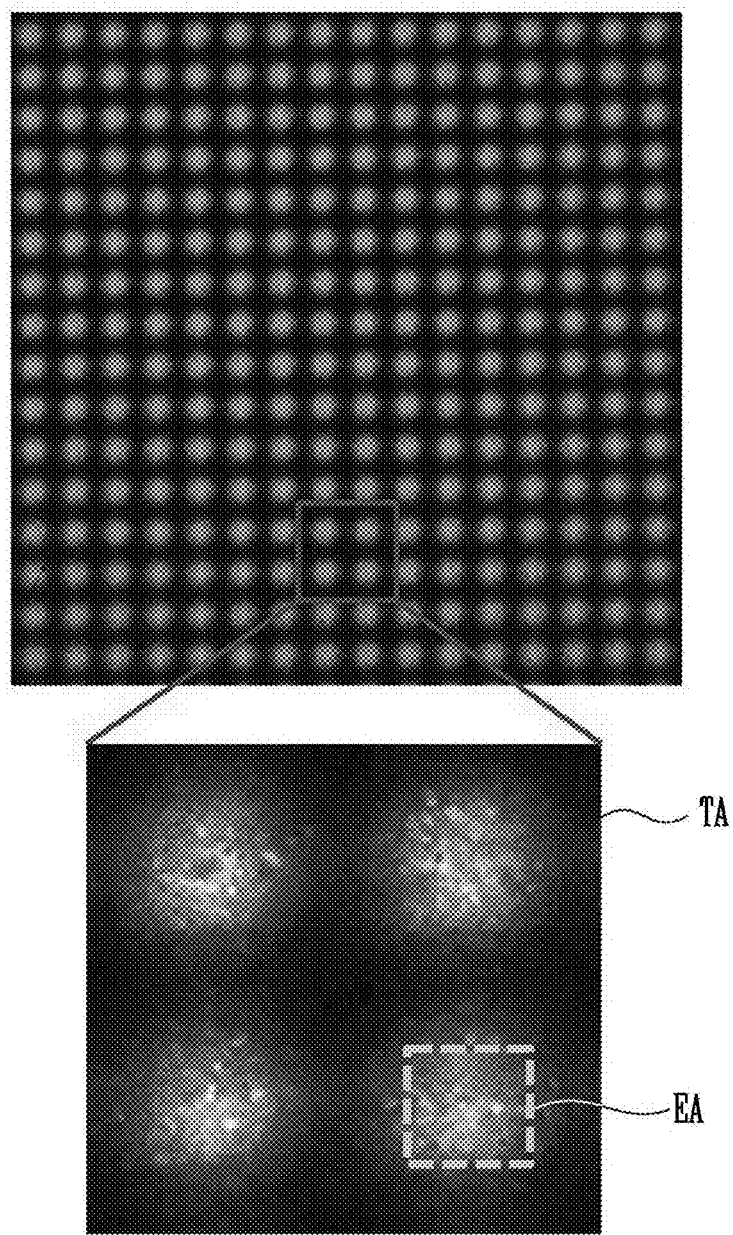

In some embodiments, the image processor 222 may receive coordinate information from the outside (e.g., the panel driver 210 shown in FIG. 1, etc.) The coordinate information may include information on a position at which contact of an object to be sensed (e.g., touch of a finger) occurs in the sensing region SA shown in FIG. 1). When the coordinate information is received, the image processor 222 may extract a touch region TA corresponding to a corresponding coordinate in an original image as shown in FIG. 14, and perform an operation which may be described on only the extracted touch region TA.

In some embodiments, when the sensing region is limited to a specific region on the display panel 110 as shown in FIG. 1, the image processor 222 may not separately receive coordinate information. Therefore, the image processor 222 may perform the operation which may be described later on the whole of the original image.

In the following embodiments, a case where the image processor 222 receives coordinate information and performs image-processing on only the touch region TA is described. However, the following embodiments may be identically applied even when the image processor 222 performs image-processing on the whole of the original image without receiving the coordinate information.

Figure 15:
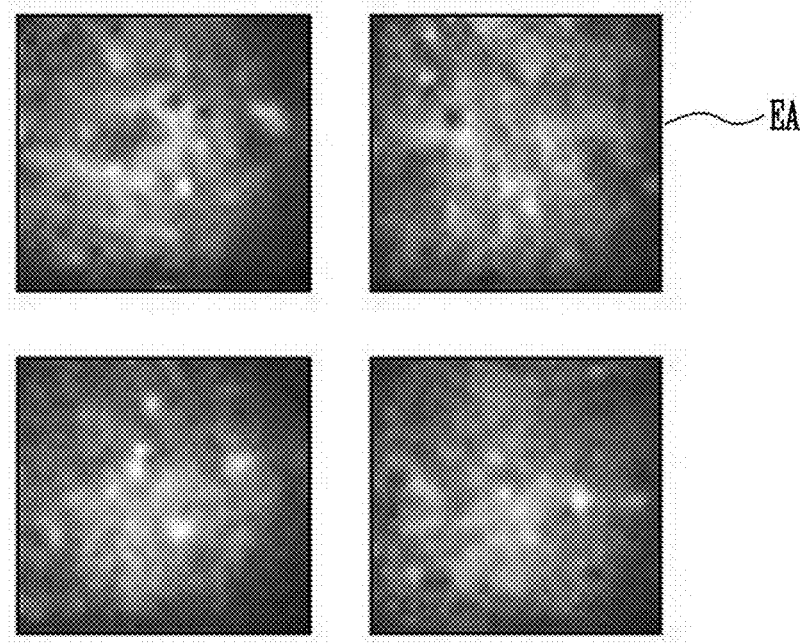

The image processor 222 may extract valid regions EA from an original image (i.e., an original image corresponding to the touch region TA) as shown in FIG. 15. Only some of the valid regions EA extracted from the original image shown in FIG. 14 are exemplarily illustrated in FIG. 15. The valid region EA may mean a region generated based on a sensing signal of a photo sensor that receives reflected light through one pin hole PIH.

In some embodiments, the image processor 222 may perform image-processing on the extracted valid regions EA.

Figure 16:
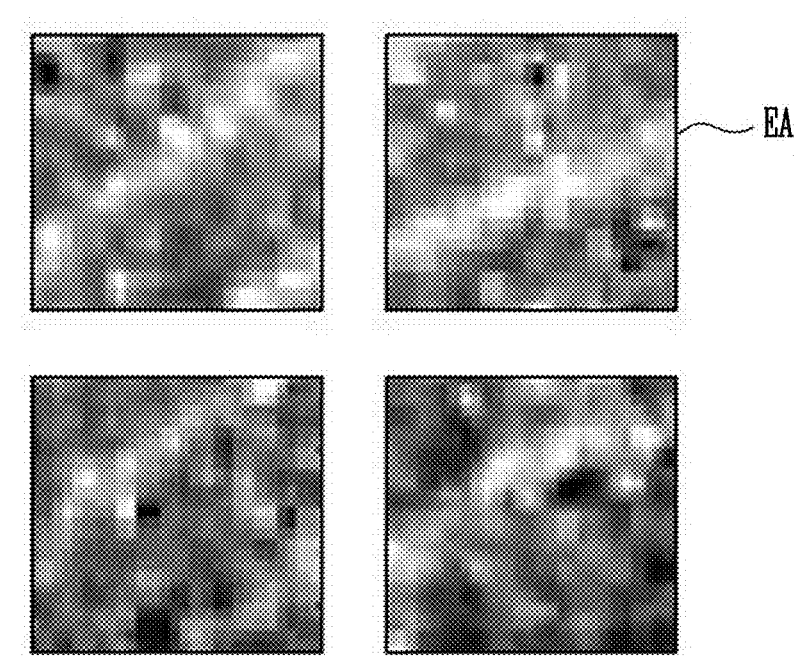

For example, the image processor 222 may perform smoothing on the valid regions EA as shown in FIG. 16. For example, the image processor 222 may increase brightness separation with respect to the valid regions EA, and remove noise, etc. The smoothing may be performed through histogram analysis with respect to each of pixels in an original image. For example, the smoothing may be performed using a median filter method. The smoothing may be performed using various suitable algorithms known in the art, and the method of performing the smoothing is not particularly limited.

In some embodiments, the image processor 222 may perform binarization and thinning on the extracted valid regions EA. For example, the image processor 222 may convert a plurality of grayscale levels or gray levels (e.g., at least corresponding one among 256 grayscale levels or gray levels) of the valid regions EA into a value corresponding to 0 (black) or 1 (white). Then, ridges constituting a fingerprint may be clearly defined as black, and valleys constituting the fingerprint may be clearly defined as white. Also, the image processor 222 may generate a line image in which the width of the ridges is one pixel from a binarized image. The binarization and thinning are performed to improve the accuracy of fingerprint detection, and may be omitted when the binarization and thinning are not required.

In some embodiments, when at least one of the above-described image-processing operations are omitted or are desired, a larger number of image-processing operations may be performed. For example, when the original image is a sufficiently satisfactory image having a small amount of noise, the smoothing may not be performed.

Figure 17:
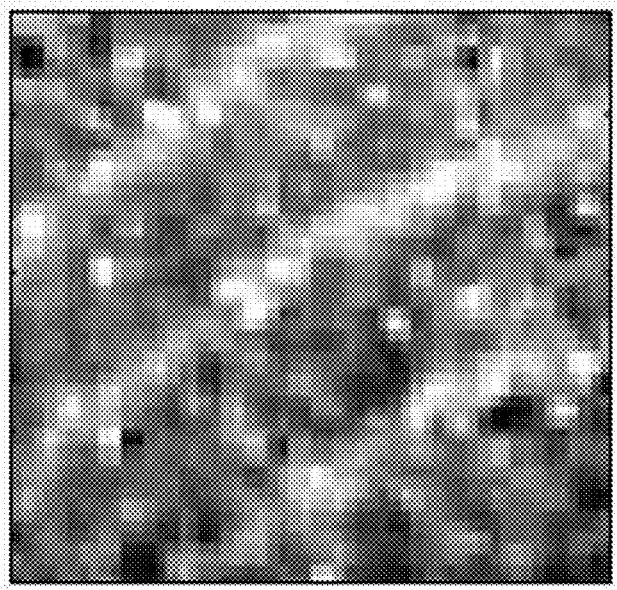

The image processor 222 may generate one image by synthesizing the valid regions EA image-processed as described above. For example, the image processor 222 may generate one synthetic image, synthetic data, or synthetic image data as shown in FIG. 17 by putting together the extracted valid images EA.

The white calibrator 223 may perform white calibration on the synthetic image generated by the image processor 222. Specifically, the white calibrator 223 may load white calibration image from the white calibration image storage 221. The white calibrator 223 may perform white calibration on the synthetic image, based on the white calibration image. For example, the white calibrator 223 may differentiate (or subtract) the white calibration image from the synthetic image. Because the white calibration image includes noise as described above, the noise may be removed from the synthetic image through image differentiation.

In some embodiments of the present disclosure, the white calibration image has a form, size, or capacity reduced (or compressed) as compared with the original white calibration image as described above. Therefore, the white calibration in accordance with the present disclosure may be applied to a synthetic image after image synthesis is performed by the image processor.

A final image (i.e., calibrated sensor data) calibrated by the white calibrator 223 may be used to detect a fingerprint. For example, in the case of fingerprint registration, the fingerprint detector 220 may store a final image and information related to the final image in the fingerprint detector 220 or in a separate storage space provided at the outside. The stored final image may be used as reference data when fingerprint detection is performed subsequently.

In the case of fingerprint authentication, the fingerprint detector 220 may acquire a final image from the outside or determine whether the fingerprint authentication has succeeded by comparing the final image with the reference data stored in the fingerprint detector 220.

Figure 18:
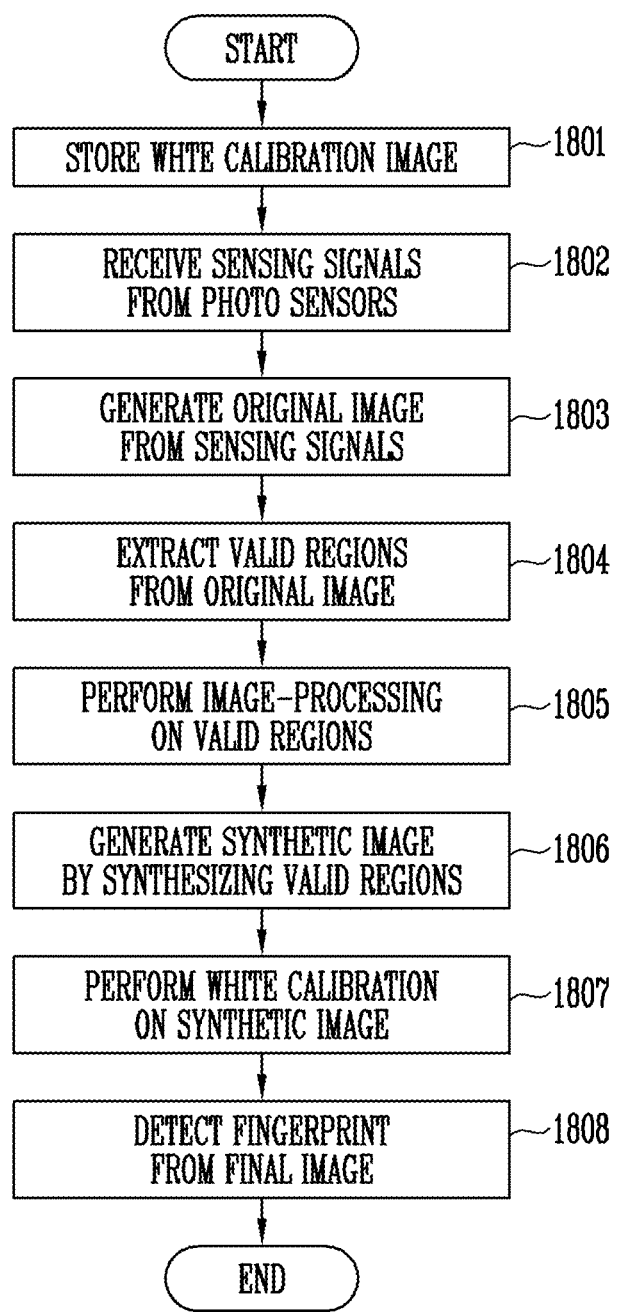
FIG. 18 is a flowchart illustrating a fingerprint sensing method of a fingerprint sensor according to some embodiments of the present disclosure.

FIG. 18 is a flowchart illustrating a fingerprint sensing method of the fingerprint sensor in accordance with some embodiments of the present disclosure. In particular, FIG. 18 is a flowchart illustrating a fingerprint sensing method of the fingerprint detector shown in FIG. 1.

Referring to FIGS. 9-18, the fingerprint detector 220 may store a white calibration image (or calibration image) (1801). The white calibration image may be generated by extracting valid regions (or partial data having a valid value) from an original white calibration image (i.e., calibration data about all photo sensors) and synthesizing the extracted valid regions.

A method of generating a white calibration image is the same as described with reference to FIGS. 9-12, and therefore, its detailed description may be omitted.

In some embodiments of the present disclosure, generation and storage of a white calibration image may be performed at least once before the display device 10 is initially driven (e.g., before a product is released). However, embodiments of the present disclosure are not limited thereto, and the generation and storage of the white calibration image may be performed after the display device 10 is initially driven.

In some embodiments, the white calibration image may be generated by another external device to be transferred to the fingerprint detector 220. Therefore, a step of receiving the white calibration image from the outside may be performed before the step of storing the white calibration image.

The fingerprint detector 220 may receive sensing signals from the photo sensors PHS (1802). The fingerprint detector 220 may receive sensing signals from the photo sensors PHS when contact of an object to be sensed occurs according to a set (e.g., predetermined) period or on the display panel 110. However, the present disclosure is not limited thereto.

In some embodiments, the fingerprint detector 220 may receive coordinate information from the panel driver 210, etc. The coordinate information may include information on a position at which contact of an object to be sensed (e.g., touch of a finger) occurs. When the coordinate information is received, the fingerprint detector 220 may perform an operation, which may be described later, on sensing signals received from photo sensors PHS at a position corresponding to the coordinate information among the sensing signals received from the photo sensors PHS.

The fingerprint detector 220 may generate an original image (or sensor data) from the received sensing signals (1803). For example, the fingerprint detector 220 may generate an original image by converting one sensing signal received from one photo sensor PHS into one pixel image.

The fingerprint detector 220 may extract valid regions from the generated original image (1804). The valid region may be a region generated based on a sensing signal of a photo sensor receiving reflected light through one pin hole.

The fingerprint detector 220 may perform image-processing on the extracted valid regions (1805). The image-processing may include, for example, at least one of smoothing, binarization, and thinning. However, embodiments of the present disclosure are not limited thereto, and a larger or smaller number of image processing techniques may be applied according to embodiments of the present disclosure. Also, in some embodiments, the step of performing image-processing may be omitted.

The fingerprint detector 220 may synthesize the image-processed valid regions (1806). For example, the fingerprint detector 220 may generate one synthetic image (or synthetic data) by putting together the image-processed valid regions. In some embodiments, the synthesis of the valid regions may be performed before the valid regions are image-processed.

The fingerprint detector 220 may perform white calibration on the synthetic image (1807). Specifically, the fingerprint detector 220 may load a pre-stored white calibration image. The fingerprint detector 220 may remove noise from the synthetic image by differentiating the loaded white calibration image from the synthetic image.

The fingerprint detector 220 may detect a fingerprint, based on a final image on which the white calibration is performed (1808). The fingerprint detector 220 may store information on the extracted fingerprint, or further perform a required operation such as authentication by comparing the information on the extracted fingerprint with information on a pre-stored fingerprint.

In the fingerprint sensing method, the fingerprint sensor, and the display device including the same in accordance with the present disclosure, only valid regions (i.e., calibration values corresponding to photo sensors that validly operate) are extracted and synthesized in an original white calibration image (i.e., calibration image of all photo sensors), and the synthesized image is stored as a final white calibration image. Thus, a storage space of the white calibration image can be minimized or reduced, and a loading time of the white calibration image can be decreased.

Also, in the fingerprint sensing method, the fingerprint sensor, and the display device including the same in accordance with the present disclosure, valid regions are extracted and synthesized from an original image (i.e., sensed data) acquired through photo sensors, and white calibration is performed on the synthetic image, so that the time required to perform white calibration on the original image acquired through the photo sensors can be decreased.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

As used herein, "a plan view"," may refer to a view from top or from a direction normal to the display area (or display plane) of the display device.

Spatially relative terms, such as "beneath", "below", "lower", "under", "above", "upper", "rear" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and equivalents thereof.

What is claimed is:

1. A fingerprint sensor comprising:
photo sensors;
a light blocking layer on the photo sensors, the light blocking layer comprising a light blocking mask having openings; and
a fingerprint detector configured to generate an original image, based on sensing signals from the photo sensors, to perform calibration on the original image by utilizing a calibration image, and to detect a fingerprint, based on the calibrated image,
wherein the calibration image is generated by synthesizing valid regions extracted from an original calibration image corresponding to the original image.

2. The fingerprint sensor of claim 1, wherein the light blocking layer is configured to transfer a first light incident into the light blocking layer to the photo sensors through the openings, and block a second light.

3. The fingerprint sensor of claim 1, wherein a first one of the photo sensors is configured to receive light through one opening, and a second one of the photo sensors is configured to receive no light or to receive light through two or more openings.

4. The fingerprint sensor of claim 1, wherein the valid regions are generated based on sensing signals from first photo sensors from among the photo sensors configured to receive light through one opening.

5. The fingerprint sensor of claim 4, wherein the original calibration image is generated based on sensing signals output from the photo sensors in response to light of a skin color.

6. The fingerprint sensor of claim 5, wherein the calibration image is generated by extracting the valid regions in the original calibration image and putting together the valid regions.

7. The fingerprint sensor of claim 6, wherein the calibration image has a capacity smaller than that of the original calibration image.

8. The fingerprint sensor of claim 6, wherein the fingerprint detector is configured to extract the valid regions in the original image, to generate a synthetic image by putting together the valid regions, and to perform calibration on the synthetic image by utilizing the calibration image.

9. The fingerprint sensor of claim 8, wherein the fingerprint detector is further configured to perform the calibration by loading the calibration image and subtracting the calibration image from the synthetic image.

10. The fingerprint sensor of claim 8, wherein the fingerprint detector is further configured to perform at least one image-processing among smoothing, binarization, and thinning on the valid regions or the synthetic image.

11. The fingerprint sensor of claim 1, further comprising:
a circuit element layer on the light blocking layer, the circuit element layer having at least one conductive layer constituting circuit elements; and
a light emitting element layer on the circuit element layer, the light emitting element layer comprising light emitting elements.

12. A fingerprint sensing method of a fingerprint sensor comprising photo sensors, and a light blocking layer on the photo sensors, the light blocking layer comprising a light blocking mask having openings, the fingerprint sensing method comprising:
storing a calibration image;
generating an original image, based on sensing signals from the photo sensors;
performing calibration on the original image by utilizing the calibration image; and
detecting a fingerprint, based on the calibrated image,
wherein the calibration image is generated by synthetizing valid regions extracted from an original calibration image corresponding to the original image.

13. The fingerprint sensing method of claim 12, wherein the valid regions are generated based on sensing signals from first photo sensors from among the photo sensors configured to receive light through one opening.

14. The fingerprint sensing method of claim 13, wherein the original calibration image is generated based on sensing signals output from the photo sensors in response to light of a skin color.

15. The fingerprint sensing method of claim 14, wherein the calibration image is generated by extracting the valid regions in the original calibration image and putting together the valid regions.

16. The fingerprint sensing method of claim 15, wherein the performing of the calibration comprises:
extracting the valid regions in the original image;
generating a synthetic image by putting together the valid regions;
loading the calibration image; and
subtracting the calibration image from the synthetic image.

17. The fingerprint sensing method of claim 16, further comprising, before the loading of the calibration image, performing at least one image-processing among smoothing, binarization, and thinning on the valid regions or the synthetic image.

18. A display device comprising:
photo sensors;
a light blocking layer on the photo sensors, the light blocking layer comprising a light blocking mask having openings;
a circuit element layer on the light blocking layer, the circuit element layer having at least one conductive layer in which circuit elements are disposed;
a light emitting element layer on the circuit element layer, the light emitting element layer comprising light emitting elements; and
a fingerprint detector configured to generate an original image, based on sensing signals from the photo sensors, to perform calibration on the original image by utilizing a calibration image, and to detect a fingerprint, based on the calibrated image,
wherein the calibration image is generated by synthesizing valid regions extracted from an original calibration image corresponding to the original image.

19. The display device of claim 18, wherein the valid regions are generated based on sensing signals from first photo sensors from among the photo sensors configured to receive light through one opening.

20. The display device of claim 19, wherein the original calibration image is generated based on sensing signals output from the photo sensors in response to light of a skin color.

* * * * *